United States Patent
Wagner (10) Patent No.: US 6,990,483 B2
(45) Date of Patent: Jan. 24, 2006

(54) METHOD, SYSTEM AND PROGRAM PRODUCT FOR AUTOMATICALLY RETRIEVING DOCUMENTS

(75) Inventor: Debra K. Wagner, Louisville, KY (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 10/190,738

(22) Filed: Jul. 8, 2002

(65) Prior Publication Data

US 2004/0006562 A1    Jan. 8, 2004

(51) Int. Cl.
G06F 17/30 (2006.01)

(52) U.S. Cl. .................................. 707/3; 707/4; 707/5
(58) Field of Classification Search ................ 707/1–4, 707/100, 7, 104.1
See application file for complete search history.

(56) References Cited

U.S. PATENT DOCUMENTS

| | | | |
|---|---|---|---|
| 4,870,568 A | 9/1989 | Kahle et al. | |
| 4,876,643 A | 10/1989 | McNeill et al. | |
| 5,367,675 A | 11/1994 | Cheng et al. | |
| 5,454,105 A | 9/1995 | Hatakeyama et al. | |
| 5,590,319 A | 12/1996 | Cohen et al. | |
| 5,696,962 A * | 12/1997 | Kupiec | 707/4 |
| 5,797,000 A | 8/1998 | Bhattacharya | |
| 5,826,261 A | 10/1998 | Spencer | |
| 5,852,826 A | 12/1998 | Graunke et al. | |
| 5,873,076 A | 2/1999 | Barr et al. | |
| 5,940,289 A | 8/1999 | Iwata et al. | |
| 5,963,946 A | 10/1999 | Yanagimoto | |
| 5,966,704 A | 10/1999 | Furegati et al. | |
| 5,978,803 A | 11/1999 | Ooe | |
| 6,014,655 A | 1/2000 | Fujiwara et al. | |
| 6,014,667 A | 1/2000 | Jenkins et al. | |
| 6,138,123 A | 10/2000 | Rathbun | |
| 6,169,982 B1 | 1/2001 | Kasao et al. | |
| 6,289,334 B1 | 9/2001 | Reiner et al. | |
| 6,341,281 B1 | 1/2002 | MacNicol et al. | |
| 6,751,606 B1 * | 6/2004 | Fries et al. | 707/3 |
| 2003/0172066 A1 * | 9/2003 | Cooper et al. | 707/7 |

OTHER PUBLICATIONS

Kendrick et al., "Method to Allow Multiple "Nested Queries" of Any Non-Text Object Within a Composite Document Simultaneously", IBM Technical Disclosure Bulletin, vol. 30, No. 7, pp. 301-302, Dec. 1987.

* cited by examiner

Primary Examiner—Alford W. Kindred
(74) Attorney, Agent, or Firm—William E. Schiesser; Hoffman, Warnick & D'Alessandro LLC (57) ABSTRACT

A method, system and program product for automatically retrieving documents is provided. Specifically, a hit list of documents is generated directly from an input file of requests. Once generated, the hit list is processed according to system, data object, storage node identification, storage drive and/or cache. Once sorted, plurality of retrieval programs are launched and executed in parallel to retrieve the requested documents.

33 Claims, 7 Drawing Sheets

METHOD, SYSTEM AND PROGRAM PRODUCT FOR AUTOMATICALLY RETRIEVING DOCUMENTS

BACKGROUND OF THE INVENTION

1. Field of the Invention

The present invention generally relates to a method, system and program product for automatically retrieving documents. Specifically, the present invention allows numerous documents to be simultaneously retrieved from disparate locations based on an input file of document requests.

2. Background Art

As the implementation of computers in business increases, the electronic archival of documents becomes more pervasive. Typically, documents that have been archived must be retrieved on a regular (e.g., daily) basis for a multitude of reasons such as reprinting, legal requests, customer inquiries, deferred processing, etc. The quantity of documents that are requested can vary depending on the type of request made and the quantity of requesters making the requests. For example, several thousand (e.g., 30,000) documents may be requested individually by several thousand customer service representatives in approximately the same time frame. In other cases, it might be necessary to retrieve millions of documents in a short amount of time so that, for example, CD-ROMs can be generated. In any event, it is important for the documents to be retrieved by the required time.

Heretofore, retrieval of documents has been an inefficient and time consuming process. Specifically, many previous systems required the requesters to individually request each desired document. Moreover, many previous systems required the requestor to manually access the storage locations to electronically retrieve the documents. Such requirements can be unduly tedious when the documents are stored over a network. In particular, many businesses implement computer networks that could include several disparate servers and workstations. Moreover, the documents could be stored on various storage media such as hard disks, tapes, drives, etc. Thus, identifying the storage locations alone could be a time consuming task.

In view of the foregoing, there exists a need for a method, system and program product for automatically retrieving documents. Specifically, a need exists for a hit list of documents to be generated based on an input file of requests. A further need exists for the hit list to be processed according to system, data object, storage node, storage drive and/or cache. Still yet, a need exists for each document in the processed hit list to be retrieved in parallel from their respective storage locations.

SUMMARY OF THE INVENTION

The present invention provides a method, system and program product for automatically retrieving documents. Specifically, under the present invention, a hit list of documents is generated (e.g., directly) based on an input file of document requests. Once generated, the hit list is processed. In a typical embodiment, processing begins by sorting the hit list according to data system, cache, storage node and data object. Once sorted, the hit list is split into sublists according to data system (e.g., one sublist for each data system). Next, each sublist is split into a next generation sublist according to storage drive and cache (e.g., one next level sublist for each drive and/or cache in which requested documents are stored). Lastly, for each next level sublist, a retrieval program is executed in parallel for retrieving the documents from their respective (remote) storage locations.

According to a first aspect of the present invention, a method for automatically retrieving documents is provided. The method comprises: (1) generating a hit list of documents to be retrieved, wherein the hit list is generated directly from an input file of requests; (2) processing the hit list according to system, data object and storage drive; and (3) retrieving the documents based on the processed hit list from at least one remote location.

According to a second aspect of the present invention, a method for automatically retrieving documents is provided. The method comprises: (1) providing a hit list of documents to be retrieved, wherein the hit list is generated directly from an input file of requests, and wherein the hit list includes location identifications where the documents are stored; (2) sorting and splitting the hit list into sublists according to system, data object and storage drive; and (3) launching a plurality of retrieval programs, wherein each of the plurality of retrieval programs corresponds to one of the sublists, and wherein the plurality of retrieval programs execute in parallel to retrieve the documents.

According to a third aspect of the present invention, a method for automatically retrieving documents is provided. The method comprises: (1) generating a hit list of documents to be retrieved directly from an input file of requests on a library system, wherein the hit list includes location identifications where the documents are stored; (2) splitting the hit list into sublists according to system; (3) sorting the sublists according to data object; (4) splitting the sorted sublists into additional sublists according to at least one of storage drive and cache; and (5) launching a plurality of retrieval programs to retrieve the documents from at least one remote location, wherein each of the plurality of retrieval programs corresponds to one of the additional sublists, and wherein the plurality retrieval programs execute in parallel.

According to a fourth aspect of the present invention, a system for automatically retrieving documents is provided. The system comprises: (1) a list system for generating a hit list of documents to be retrieved, wherein the hit list is generated directly from an input file of requests received on a library system; (2) a processing system for processing the hit list according to system, data object and storage drive; and (3) a retrieval system for retrieving the documents based on the processed hit list from at least one remote location.

According to a fifth aspect of the present invention, a program product stored on a recordable medium for automatically retrieving documents is provided. When executed, the program product comprises: (1) program code for generating a hit list of documents to be retrieved, wherein the hit list is generated directly from an input file of requests received on a library system; (2) program code for processing the hit list according to system, data object and storage drive; and (3) program code for retrieving the documents based on the processed hit list from at least one remote location.

Therefore, the present invention provides a method, system and program product for automatically retrieving documents.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

In general, the present invention provides a method, system and program product for automatically retrieving documents from remote storage locations. Specifically, the present invention allows a hit list of documents to be generated based on an input file of document requests. Once generated, the hit list is processed (i.e., split and sorted) according to system, data object, storage node, storage drive and/or cache. For each resulting sublist, a retrieval program is launched and executed in parallel to retrieve the documents. Typically, the present invention is implemented to run as a daemon (i.e., continuously). However, as will be further described below, the present invention could be implemented in a non-daemon format.

Figure 1:
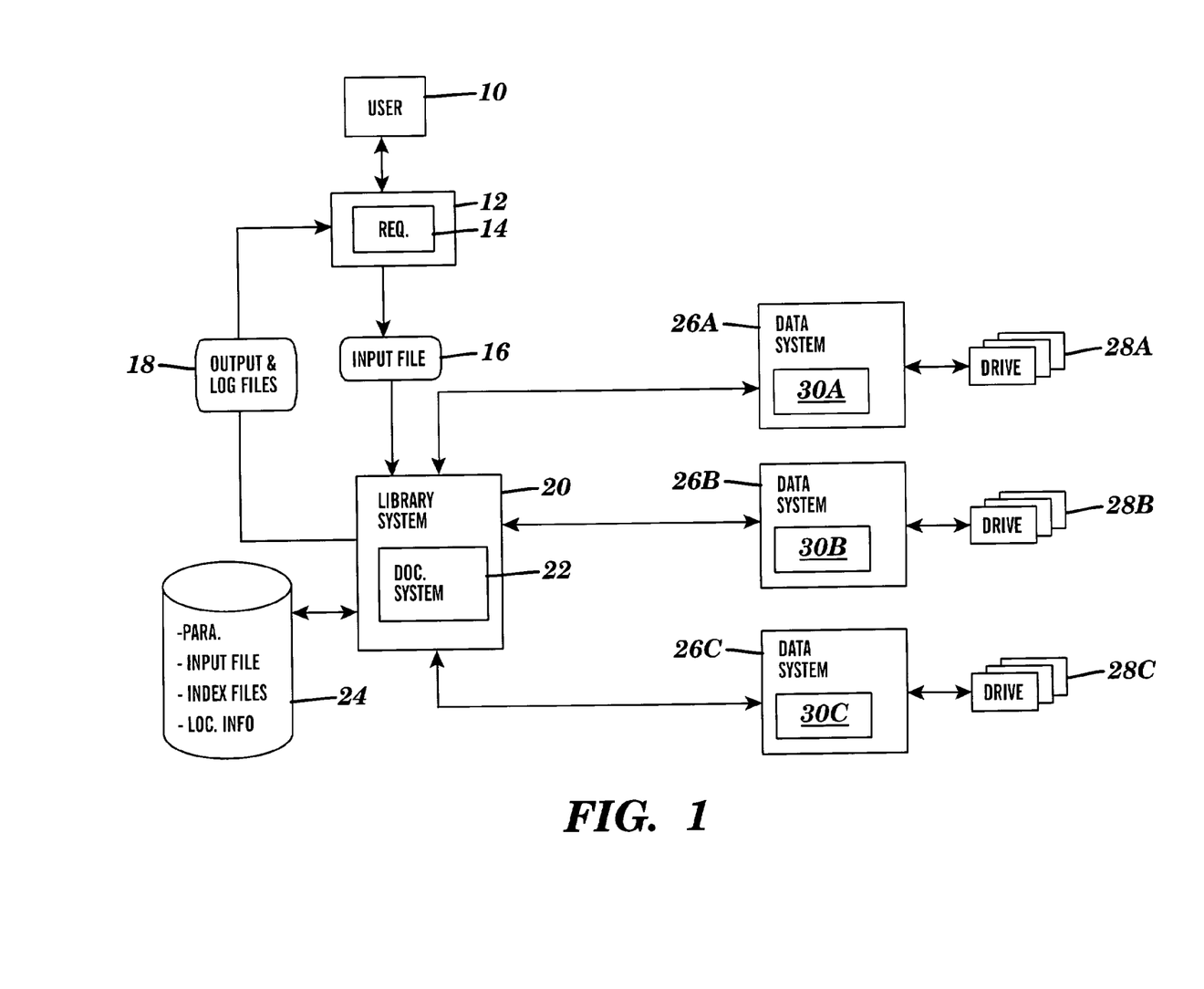
FIG. 1 depicts a block diagram of a system for automatically retrieving documents according to the present invention.

Referring now to FIG. 1, a typical embodiment of the present invention is shown. In general, user 10 will enter document requests via user system 12. Each request pertains to one or more documents which user 10 wishes to retrieve from remote storage locations 26A–C, 28A–C and/or 30A–C. Typically, user 10 will enter the requests according to a document name, serial number, or the like. Request system 14 will then package the requests into input file 16 for processing by document system 22. To this extent, input files 16 are typically sent to a specific directory/destination within the network. Document system 22 is programmed to "look" at the input file destination to detect and process input files 16. Document system 22 will then use library system 20 to locate and retrieve the requested documents. Specifically, library system 20 manages the storage of documents on data systems 26A–C and as such, can be used to locate documents.

As depicted, document system 22 is stored on library system 20, which is also the destination of input files 16. However, it should be understood that any variation could be implemented. For example, input file 16 could be transmitted to directory "X" on computer system "Y" (not shown), while document system 22 is stored on computer system "Z" (not shown). Alternatively, document system 22 could be stored on user system 12 (along with request system 14). Regardless of the configuration, document system 22 is programmed to "scan" the input file destination (wherever it may be) to identify new input files, and then use library system 20 to locate and retrieve the requested documents. Accordingly, the configuration shown in FIG. 1 is not intended to be limiting.

As referred to herein, user system 12, library system 20 and data systems 26A–C are intended to be any type of computer system. Examples include a workstation, laptop, server, etc. In a typical embodiment, library system 20 and data systems 26A–C are servers while user system 12 is a client.

Under the present invention, two types of input files 16 could be generated. In a preferred embodiment, input file 16 is in a "hit list" format meaning that all information necessary to locate and retrieve the requested documents is contained within input file 16. In this embodiment, request system 14 will receive document requests from user 10 and use location information in database 24 of library system 20 to generated input file 16 in hit list format. For example, request system 14 can receive document names, serial numbers etc. from user 10 and then correlate each document with corresponding location information from database 24 Once correlated, the requests and location information can be transmitted to library system 20 as input file 16. In another embodiment, request system 14 does not generate input file 16 in a hit list format. Rather, request system 14 merely packages requests as provided by user 10. As will be further explained below, this latter embodiment is referred to as a query or index format. Specifically, the query format comprises of index values that are used to build one or more query strings.

In any event, input file 16 is generated, it can be processed by document system 22 into a hit list of documents. To this extent, parameters can be designated for controlling the processing. For example, one parameter could specify a request quantity whereby an input file will only be processed if it has a minimum quantity of requests. This prevents document system 22 from processing input files 16 and retrieving documents unless a minimum quantity of requests are present. Along these lines, a time limit can also be designated whereby a received input file 16 must be processed after a specific amount of time. Thus, every input file 16, no matter how small, will be processed in a timely fashion. Another parameter that could be designated is whether an index file is created. Typically, the index file is in hit list format and includes all of the requests that were contained in input files 16. The information in the index file will be used to build a database of the document information so that it can be written to a recordable medium (e.g., CD-ROM).

Generation of the hit list depends on the format in which input file 16 was received. If input file 16 was received from user system 12 in the hit list format, the hit list can be generated directly from input file 16. That is, generation of the hit list requires only rearrangement of the information within input file 16. If, however, input file 16 was received in the query format, the hit list must be developed based upon query of database 24 Specifically, the index values in query format input file 16 are used to build an SQL query string that is used to search database 24 for information to compile the hit list. For each request record in each input file 16 such a query is performed and the hit list is generated based on the query results. The queries must then be repeated after the hit list is processed when the documents are to be retrieved (as will be further described below).

Regardless of the format of input file 16, the generated hit lists will be processed and used to retrieve the documents. In a typical embodiment, processing involves sorting and then splitting the hit list. For example, the hit list could first be sorted (i.e., arranged) according to data system 26A–C, cache, storage node and data object. As used herein, the term data objects refers to the chunks in which data is stored. Specifically, when data is stored, it is typically stored objects that contain one or several documents, depending on the document size. Data object sorting is done so that the objects are retrieved only once. That is, all of the documents that belong to the same object will be retrieved at the time the object is retrieved. Sorting by data object also optimizes the physical retrieval of the tape or optical platter from within the storage device for the tapes or optical platters. In addition, the term storage node is used to define which storage devices will be used to store the data and how long the data will be retained on the storage device. For example, one storage node could be used for optical platters and another storage node could be used for tapes. Alternatively, both storage nodes could be used for tapes, but one storage node is used to retain data for seven years, while the other is used to retain data for one year. Moreover, the term storage drive is intended to refer to any type of tape or optical drive that is capable of storing data.

In any event, once the hit list has been sorted, it could then be split into sublists according to data system 26A-C. Once split, each sublist could then be split into a next level of sublists according to storage drive and cache. For example, assume that eight documents have been requested. Further assume that the eight documents are stored on two data systems, and there are documents stored in both cache and non-cache. After the sorting, the list would look similar to:
 datasys1, cache, nid1, objname1-doc1
 datasys1, cache, nid1, objname1-doc2
 datasys1, optical, nid2, objname2-doc3
 datasys1, optical, nid3, objname3-doc4
 datasys2, cache, nid1, objname1-doc5
 datasys2, cache, nid1, objname1-doc6
 datasys2, optical, nid2, objname2-doc7
 datasys2, optical, nid3, objname3-doc8

As shown, the hit list has been sorted according to data system, then by cache/non-cache, then by storage node and finally by data object.

After the sorting is complete the hit list is then split into sublists according to data system, storage drive and cache. In one embodiment, the hit list is first split according to data system. Since there are two data systems in the above example, the following two sublists will result.
 Sublist One
 datasys1, cache, nid1, objname1-doc1
 datasys1, cache, nid1, objname1-doc2
 datasys1, optical, nid2, objname2-doc3
 datasys1, optical, nid3, objname3-doc4
 Sublist Two
 datasys2, cache, nid1, objname1-doc5
 datasys2, cache, nid1, objname1-doc6
 datasys2, optical, nid2, objname2-doc7
 datasys2, optical, nid3, objname3-doc8

Next, the two sublists will be split according to storage drive and cache. Assuming each data system has two storage drives containing requested documents, and that requested documents are stored in cache on both data systems, each of the sublists will be split into three next level sublists (two for storage drive documents and one for cache documents). The following are examples of next level sublists that could result after the splits have occurred:
 Sublist1
 datasys1, cache, nid1, objname1-doc1
 datasys1, cache, nid1, objname1-doc2
 Sublist2
 datasys2, cache, nid1, objname1-doc5
 datasys2, cache, nid1, objname1-doc6
 Sublist3
 datasys1, optical, nid2, objname2-doc3
 Sublist4
 datasys1, optical, nid3, objname3-doc4
 Sublist5
 datasys2, optical, nid2, objname2-doc7
 Sublist6
 datasys2, optical, nid3, objname3-doc8

For the architecture shown in FIG. 1, if each data system 26A–C has two storage drives 28A–C containing requested documents, and each cache 30A–C includes requested documents, nine "next level" sublists will result (i.e., three for each data system 26A–C).

It should be understood that the precise order in which the sorting and splitting steps are performed is not intended to be limiting. For example, the hit list could first be split according to data system 26A–C, then sorted according to data system, cache, storage node and data object, and then split into the next level sublists. Alternatively, all splitting could be performed in one step. For example, the hit list could be sorted and then split into hit lists according to data system 26A–C, storage drive 28A–C and cache 30A–C in one step. Accordingly, the order/means in which the steps are performed is not limiting as long as a separate sublist for each storage drive and/or cache containing requested documents results. It should also be appreciated that not all storage drives 28A–C and/or caches 30A–C will store requested documents. To this extent, next level sublists are only created for storage drives 28A–C and/or caches 30A–C actually storing requested documents. It should also be understood that although not shown, other storage locations could exist. For example, each data system 26A–C could communicate with a database (not shown) that also stores documents. In this case, for each database storing requested documents, another next level sublist would be generated. Once the hit list has been processed (sorted and split), the documents will be retrieved. In a typical embodiment, the documents are retrieved by document system 22 by launching a retrieval program for each next level sublist. In the example above, this would result in six retrieval programs being launched. Once launched, the retrieval programs are executed in parallel, through library system 20, to retrieve the documents in the processed hit list from storage locations 26A–C, 28A–C and/or 30A–C. In another embodiment, the documents could be retrieved in batch by document system 22 (as will be described below).

Retrieval of the documents depends on the format of input file 16. Specifically, if input file 16 was provided in query format, the query process must be repeated to rebuild the hit list before the documents can be retrieved. Specifically, when input file 16 is provided in a query format, the hit list is created by query and then erased from memory. Accordingly, the hit list must be recreated by query so that the documents can be retrieved. The benefit of providing input file 16 in the hit list format (preferred) is that the queries do not have to be performed a second time for each document. In addition, by providing input file 16 in a hit list format deferred processing is possible. In particular, deferred processing is provided when user 10 requests documents and request system 14 generates input files 16 in hit list format. Request system 14 queries database 24 on library system 20 using provided application program interfaces (APIs). The document location information is then returned to request system 14.

Once retrieved, the documents could be accessed at library system 20 by user 10 via user system 12. Alternatively, the retrieved documents could be outputted to user 10 via a recordable medium (e.g., CD-ROM) or via user system 12. In addition, any error files and/or optional index files could be outputted to user 10. Error files are generated when a request entered by user 10 contains errors that make the processing and/or retrieval impossible. This could be, for example, a typographical error in entering a document name or serial number. In the event of an error, an error file that contains error codes describing the exact error could be automatically generated and outputted to user 10. To this extent, generation and output of the error file need not wait until processing or retrieval is complete. Rather, the error file could be generated immediately upon recognition of an error. The error file could also include information messages detailing the steps of the retrieval process. In any event, the files could be outputted to user 10 along with the requested documents on a single recordable medium.

Figure 2:
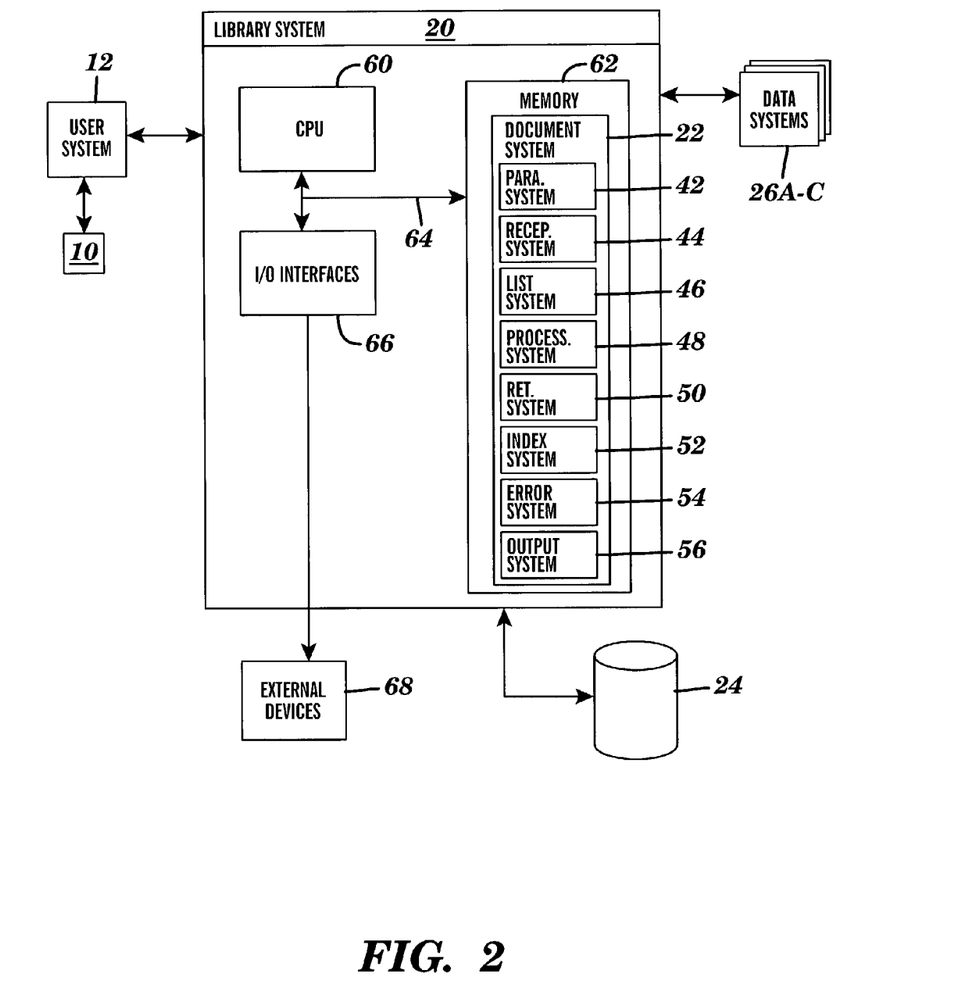
FIG. 2 depicts an exemplary library system as shown in FIG. 1.

Referring now to FIG. 2, a more detailed diagram of library system 20 is shown. As depicted, library system 20 generally comprises central processing unit (CPU) 60, memory 62, bus 64, input/output (I/O) interfaces 66, external devices/resources 68 and database 24. CPU 60 may comprise a single processing unit, or be distributed across one or more processing units in one or more locations, e.g., on a client and server. Memory 62 may comprise any known type of data storage and/or transmission media, including magnetic media, optical media, random access memory (RAM), read-only memory (ROM), a data cache, a data object, etc. Moreover, similar to CPU 60, memory 62 may reside at a single physical location, comprising one or more types of data storage, or be distributed across a plurality of physical systems in various forms.

I/O interfaces 66 may comprise any system for exchanging information to/from an external source. External devices/resources 68 may comprise any known type of external device, including speakers, a CRT, LED screen, hand-held device, keyboard, mouse, voice recognition system, speech output system, printer, monitor, facsimile, pager, etc. Bus 64 provides a communication link between each of the components in library system 20 and likewise may comprise any known type of transmission link, including electrical, optical, wireless, etc. In addition, although not shown, additional components, such as cache memory, communication systems, system software, etc., may be incorporated into library system 20.

Database 24 may provide storage for information necessary to carry out the present invention. Such information could include, among other things, parameters, input files, index files, error files, etc. As such, database 24 may include one or more storage devices, such as a magnetic disk drive or an optical disk drive. In another embodiment, database 24 includes data distributed across, for example, a local area network (LAN), wide area network (WAN) or a storage area network (SAN) (not shown). Database 24 may also be configured in such a way that one of ordinary skill in the art may interpret it to include one or more storage devices. It should be understood that although not shown, user system 12 and data systems 26A–C typically contain components (e.g., CPU, memory, etc.) similar to library system 20. Such components have not been separately depicted and described for brevity purposes.

It should be understood that communication between user system 12, library system 20 and data systems 26A–C could be provided through any known means. For example, user system 12, library system 20 and data systems 26A–C could be connected via direct hardwired connections (e.g., serial port), or via addressable connections (e.g., remotely) in a client-server environment. In the case of the latter, the server and client may be connected via the Internet, wide area networks (WAN), local area networks (LAN) or other private networks. The server and client may utilize conventional network connectivity, such as Token Ring, Ethernet, or other conventional communications standards. Where the client communicates with the server via the Internet, connectivity could be provided by conventional TCP/IP sockets-based protocol. In this instance, the client would utilize an Internet service provider to establish connectivity to the server.

Stored in memory 62 of library system 20 is document system 22 (shown as a program product). As depicted, document system 22 includes parameter system 42, reception/location system 44, list system 46, processing system 48, retrieval system 50, index system 52, error system 54 and output system 56. As described above, user 10 manipulates user system 12 to designate parameters and create/transfer input files containing document requests to library system 20. Typical parameters which user 10 can designate is whether document system 22 should be run as a daemon, a minimum request quantity an input file must have before being processed, a maximum time limit an input file can wait before being processed etc. In one embodiment, the parameters are designated using programmable flags. Listed below, are some exemplary flags and corresponding definitions:

-c output_dir: The file system where data systems 26A–C store the retrieved documents. The default is the directory where the document system 22 is invoked.

-d input_dir: The file system that contains the input files. The input directory is a required flag. This flag is ignored when the document system 22 is executed using the -R requests_file flag.

-e "delimiter": The character that separates field values. The default delimiter is a comma.

-f folder: A folder name that is required when the document system 22 is run as a daemon.

-F parmfile_ext: The extension of the input file that contains the request records. The extension consists of the period character followed by three additional characters (for example: .ext). The default is ".prm". This parameter is ignored when the document system 22 is executed using the -R requests_file flag.

-h host: The fully qualified host name or IP address of library system 20. The host name is a required parameter.

-H: If specified, the input file is in the hit list format.

-I: If specified, an index file will be created. This flag is ignored when the document system 22 is executed using the -R requests_file flag.

-l: If specified, messages are written to a log file rather than sending them to stderr and stdout. This flag is ignored when the document system 22 is run as a daemon.

-m min_nbr: The minimum number of entries that must be present to initiate processing. If the minimum number of entries are not present, document system 22 will sleep for -t seconds. The minimum number of entries is a required flag. This flag is ignored when the document system 22 is executed using the -R requests_file flag.

-n nbr_drives: The maximum number of drives 28A–C, per data system 26A–C, that will be utilized during the retrieval process. The default is one drive. This parameter is ignored when the document system 22 is executed using the -R requests_file flag.

-p password: The password for the user specified with the -u parameter. The password is a required parameter when the document system 22 is run as a daemon. If there is no password, specify -p "".

-r: If specified, reconciliation processing will be performed. This process consists of performing a query for all of the requests and generating an .rcn file if an error occurs. No documents will be retrieved. This flag is ignored when the document system 22 is executed using the -R requests_file flag. This flag cannot be used with the -H flag since database queries are not performed for the hit list file format.

-t seconds: The polling time in seconds. This is the interval that the document system 22 checks the input directory for new input files. The default is 600 seconds (ten minutes). This parameter is ignored when the document system 22 is executed using the -R requests_file flag.

-R requests_file: The name of the file that contains retrieval requests. This parameter is used for immediate processing of the requests in the file. Primarily, this parameter will be used to resubmit requests that were not processed due to some type of error.

-T seconds: The maximum wait time in seconds. This value is compared to the last-update-time for the input file to determine if the retrievals in the input file should be processed. The maximum wait time is a required parameter. This parameter is ignored when the document system 22 is executed using the -R requests_file flag.

-u userid: The userid of a document system 22 user. The userid could be a required parameter when the document system 22 is run as a daemon.

-v: If specified, generate informational messages in addition to error messages.

Once any parameters are generated, user 10 will enter requests for documents. As indicated above, the requests will be packaged into one or more input files that could be in one of two formats. The first format is the hit list format in which all information needed to retrieve the requested documents is contained within the input file. The input file in the hit list format includes one or more records with each record representing a document request. Each field in the input record is separated by a character. The character that is used as the delimiter is identified by the value for the -e flag or by default, a comma is assumed. The input record also includes a unique identifier that is used as the name of the file where the document is saved. Other fields are also provided in the input record so that a hit can be recreated; thus eliminating the need to query database 24. Listed below are typical fields that could be provided:

unique identifier: The name of the file where the document will be written.

location: The location of the document; cache, storage media, external cache, unknown.

agid: The application group identifier.

db_field1-db_fieldn: The database fields in application group order.

name: The object name identifier (i.e. 2FAAA).

offset: The offset into the object where the document can be located.

length: The length of the document.

comp offset: The offset into the compressed object.

comp length: The compressed object length.

annotation: A flag that indicates whether there are annotations.

compression type: The compression algorithm used.

resource id: The resource identifier.

primary node id: The primary node identifier.

secondary node id: The secondary node identifier.

If the input file is in query format, the file will include one or more records with each record representing a document request. Similar to the hit list format input file, each field in the input record is separated by a character. The character that is used as the delimiter is identified by the value for the -e flag or by default, a comma is assumed. However, in the query format, fields 2-n in the record correspond to the index field values in the application group. The order in which the index field values are listed in the record could have many variations. In one embodiment, the order is by folder field query order (e.g. field 2 corresponds to the value for the 1st folder field listed in the Search Criteria area of the Client, field 3 corresponds to the value for the 2nd folder field listed in the Search Criteria area, etc.). The first field is not an index field, but is the document identifier. Index fields that are not used to identify the document can have "null" values specified in the record. Consecutive commas in the record specify null values and will not be included in the SQL search string. When using a null value for the last index field value, the last character on the record must be the delimiter (i.e. blank spaces are not allowed at the end of the record).

In providing an input file in query format, document system 22 will have to query database 24 to build the hit list. In contrast, if the input file is received in hit list format document locations are provided and the hit list can be generated directly from the input file (i.e., without a query). In either event, reception system 44 will read input files 16 and optionally store the same in database 24. If input files are sent to a destination other than library system 20, and/or if document system 22 is stored on a computer system other than library system 20, reception system 44 will access the appropriate destination to read the input files. In any event, once read, list system 46 will process the input file (according to any parameters) to build the hit list of documents. As indicated above, document system 22 can be programmed to automatically generate a hit list as each new input file is received. Alternatively, user 10 could have designated parameters (e.g., request quantity, minimum time, etc.) which would alter this schedule.

Figure 3:
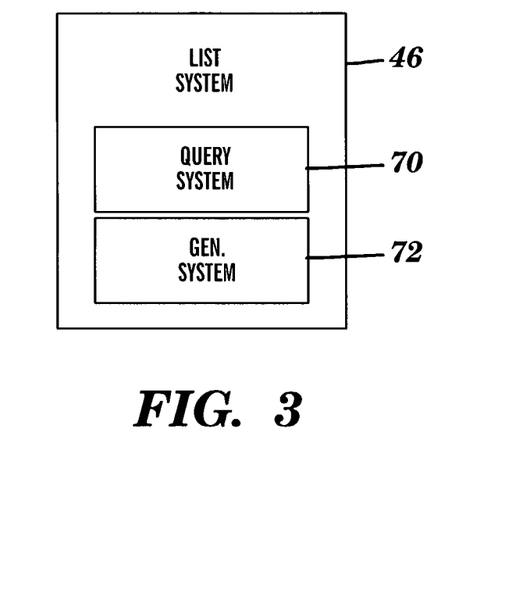
FIG. 3 depicts an exemplary list system as shown in FIG. 2.

In generating the hit, list system 46 will perform all necessary steps. Specifically, referring to FIG. 3, list system 46 is shown in greater detail. As depicted, list system includes query system 70 and generation system 72. If the input file was in hit list format, generation system 72 will process the file and generate the hit list directly therefrom. However, if the input file was in query format, query system 70 will generate the SQL query string(s) and conduct the necessary queries to retrieve the information needed by generation system 72 to generate the hit list.

Figure 4:
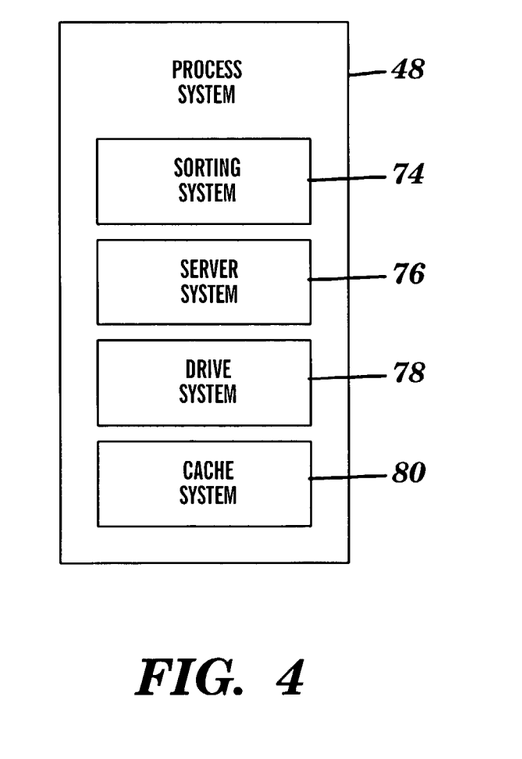
FIG. 4 depicts an exemplary processing system as shown in FIG. 2.

Once the hit list has been generated, it must be processed via processing system 48. As shown in FIG. 4, processing system 48 includes sorting system 74, server system 76, drive system 78 and cache system 80. Sorting system 74 will sort (e.g., rearrange) the hit list according to data system 26A–C, cache, storage node and data object (as described above). Once sorted, server system 76 will split the hit list into sublists according to data system 26A–C. That is, a separate sublist will be created for each data system 26A–C so that if there are three data systems, three sublists will be created. This splitting will streamline the retrieval process because all documents on a sublist are stored within a particular data system and thus, the retrieval time is shortened. Once split, the sublists will be further split into a next level of sublists according to storage drive and cache by drive system 78 and cache system 80, respectively. For example, if each data system 26A–C has documents stored on one drive and in cache, two next generation sublists will be created for each data system 26A–C, yielding a total of six next generation sublists.

Figure 5:
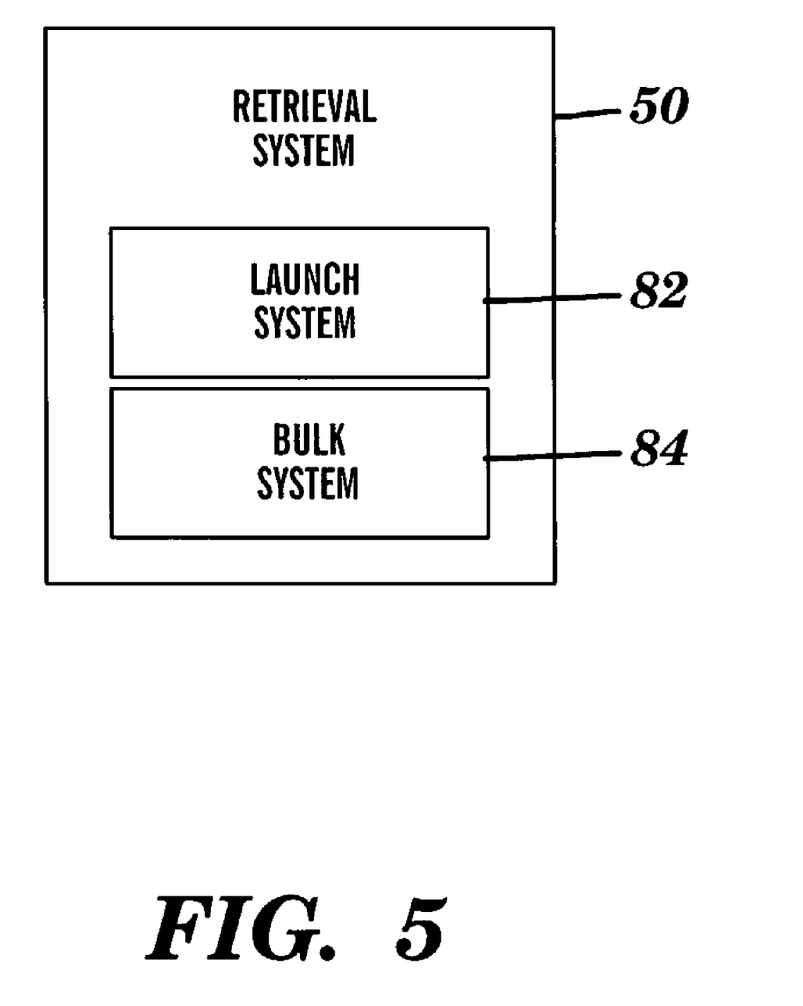
FIG. 5 depicts an exemplary retrieval system as shown in FIG. 2.

Once the hit list has been processed (i.e., sorted and split), the documents therein can be retrieved. Referring to FIG. 5, retrieval system 50 is shown in greater detail. As shown, retrieval system 50 includes launch system 82 and bulk system 84. In a typical embodiment, the documents on the hit list are retrieved in parallel. Specifically, launch system 82 will launch a separate retrieval program (e.g., agent based) for each sublist created by processing system 48. In the example above, six sublists (next generation) were created. Accordingly, launch system 82 will launch six separate retrieval programs, which will each communicate with a particular drive or cache of a particular data system. Each of the retrieval programs will execute in parallel in retrieving the documents. In another embodiment, the documents could be retrieved in bulk via bulk system 84. Typically, bulk retrieval is implemented when document system 22 is run as a non-daemon and the hit list is not processed. That is, separate sublists are not created. In this case, bulk system 84 will launch one or more retrieval programs to retrieve all documents in the hit list in bulk. In either event, if input file 16 was provided in query format, a second query and hit list generation is required before the documents can be retrieved. In this case, list system 46 of FIG. 3 will reactivate to conduct the necessary query and list generation.

Referring back to FIG. 2, index system 52 will create an index file in the event it was requested (e.g., via parameter system 42) by user 10. With respect to errors, error system 54 will detect and record errors that occur during document retrieval. In general, errors result from incorrect information in a request (record). In addition to detecting errors, error system 54 can generate informational messages detailing the entire retrieval process. The messages and detected errors can be reported to user 10 in the form of an error or log file. The error file name is generally the name of the input file containing the error with an error code extension that defines the error. If the original input file contains multiple records and several of the records have the same error, multiple records will be written to the error file. The following is a list of error codes/extensions and a description of their meaning:

.RC1: There are not enough index field values in the request record.
.RC2: There are too many index field values in the request record.
.RC3: An index field value is not valid.
.RC4: The document identifier is missing in the request record.
.RC5: The document file name is not valid.
.RC6: The database query did not find a document for the index field values.
.RC7: The database query failed.
.RC8: The data system for the document could not be determined.
.RC9: The requests file specified with the -R flag could not be opened.
.RC10: The input file does not contain any request records.
.RC11: The input file could not be opened.
.RC12: The document file could not be opened.
.RC13: The resource group could not be retrieved.
.RC14: The document could not be retrieved.
.RC15: A hit could not be recreated from the request record because of invalid or missing fields.
.RC16: The document location is missing from the request record.
.RC17: The application group identifier (agid) is missing from the request record.
.RC18: The application group identifier (agid) in the request record is not valid.
.RC19: The application group identifier (agid) in the request record is not in the folder.

Once any index files and/or error files have been created, output system 56 will output the same to user 10.

Figure 6:
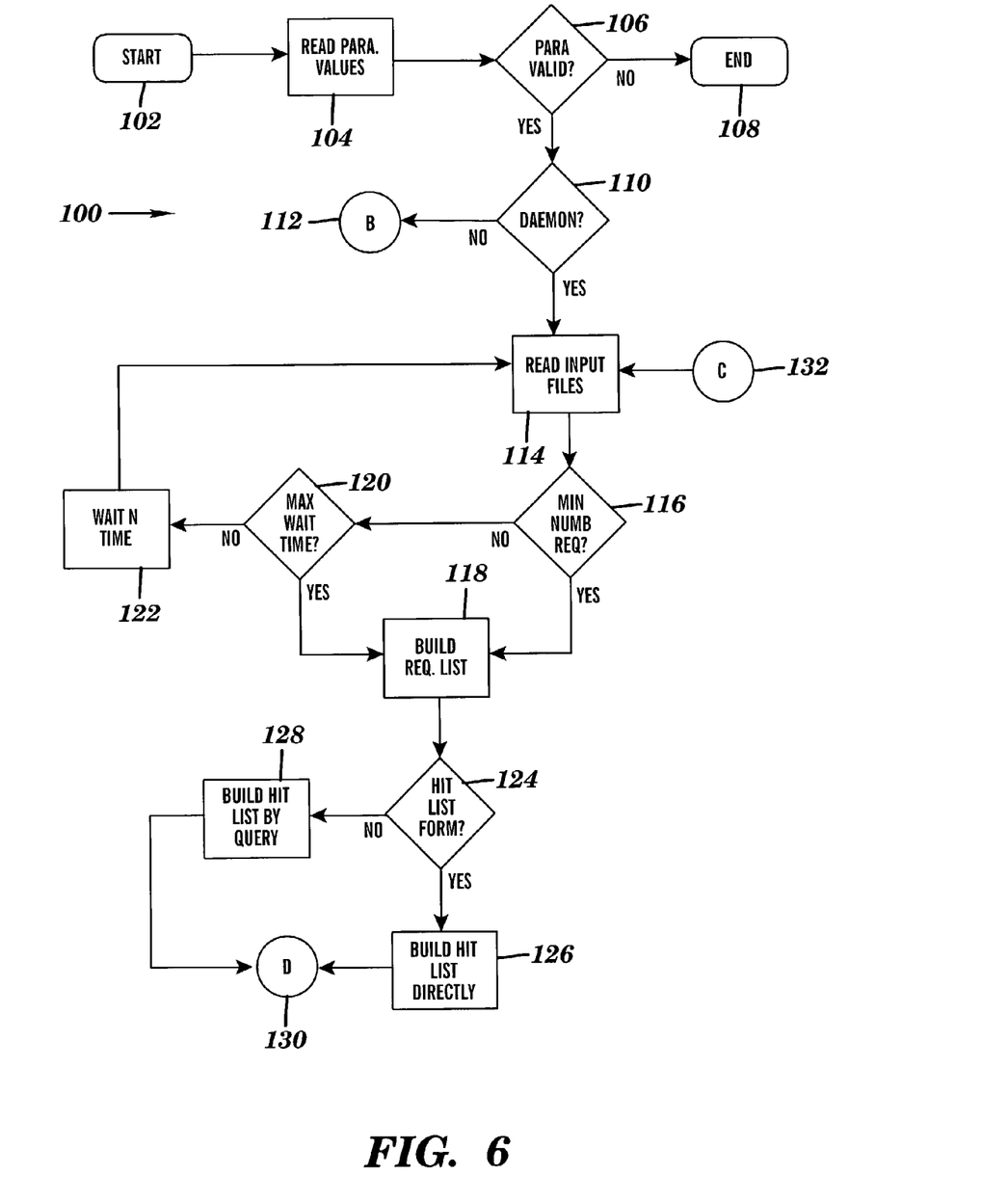
FIG. 6 depicts a first method flow diagram according to the present invention.
Figure 8:
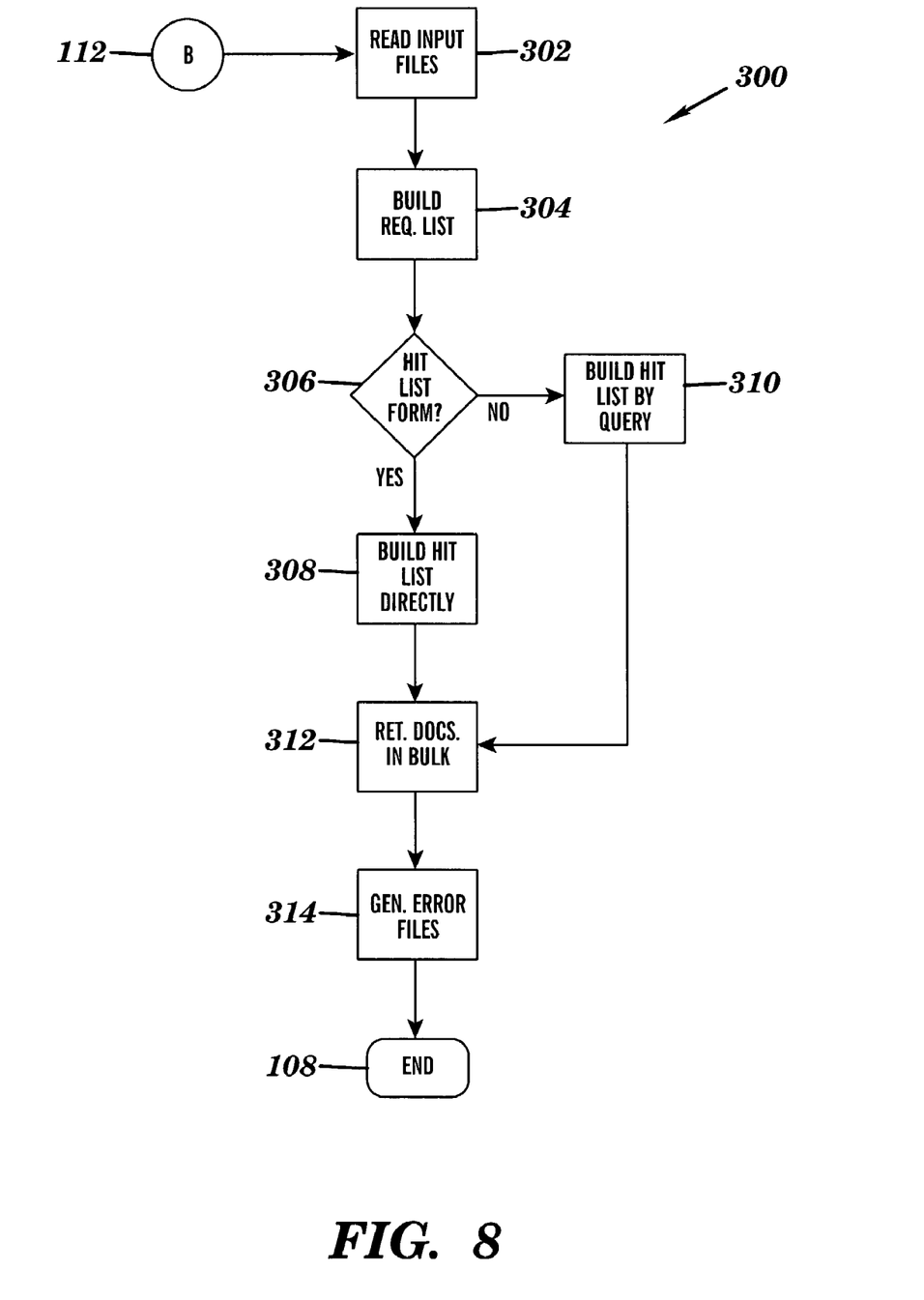
FIG. 8 depicts a third method flow diagram according to the present invention.

Referring now to FIG. 6, a first flow diagram according to the present invention is shown. In general, the program is started 102 and parameter values are read 104. Parameter values are those designated via parameter system 42 and described above. Once the parameter values are read, it will be determined whether the values are valid 106. If not, the program is terminated 108. If, however, the values are valid, it is determined whether the program is being run as a daemon 110 (i.e., continuously). If not, the processes will follow the steps set forth beginning with step "B" 112 in flow diagram 300 (FIG. 8). If the program is being run as a daemon, input files 16 will be read 114. As indicated above, input files 16 are read by document system 22 from whatever destination they were transmitted to from user system 12. To this extent, input files 16 need not be transmitted to library system 20. Moreover, document system 22 need not be loaded on library system 20. In any event, once input files 16 have been read, it will then be determined whether input files 16 contain a minimum quantity of requests 116, as specified by the parameters. If not, it will be determined whether the maximum wait time has been exceeded 120. If not, a specified wait time will be reached 122 and input files 16 will be read again 114. If however, the minimum quantity of requests were provided, or the maximum wait time was reached, the request list will be built 118. Once built, it will be determined whether the input file was in hit list format 124. If so, the hit list can be built directly from the input files 126. If not, the hit list must be built by querying database 24 of library system 20. In either event, once the hit list has been generated, the process proceeds to step "D" 130 in flow diagram 200.

Figure 7:
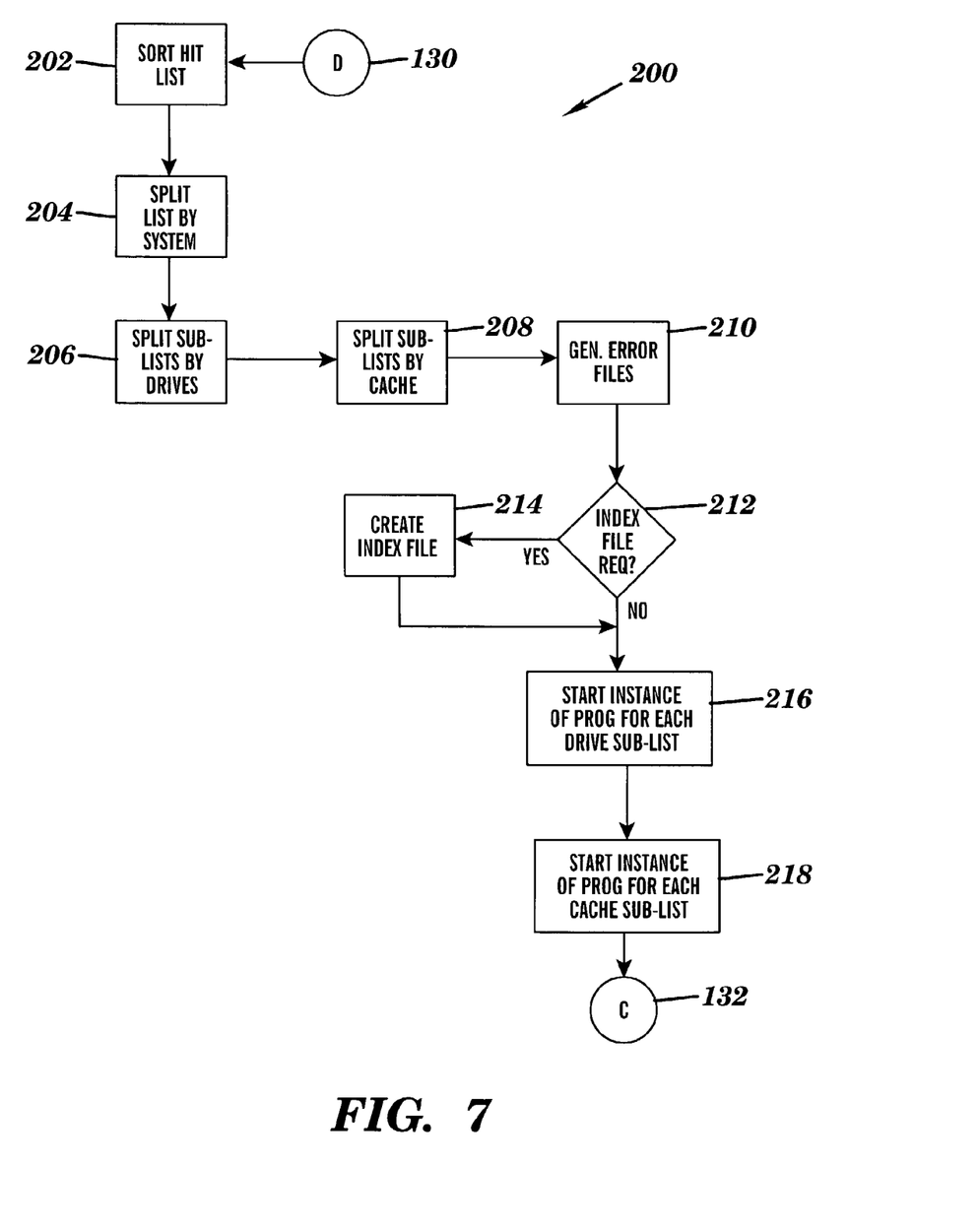
FIG. 7 depicts a second method flow diagram according to the present invention.

Referring now to FIG. 7, flow diagram 200 is shown in greater detail. As depicted, once the hit list has been formed, it will be sorted according to system (data systems 26A–C), cache, data object and/or storage node identification 202, split according to system 204, and then split again according to drive 206 and cache 208 (if any). Then, error files are generated detailing any errors that were detected 210. It will then be determined whether index files were requested 212. If so, the index files will be created 214. If not, the program will proceed directly to document retrieval. To this extent, a separate retrieval program will be started for each drive sublist 216, while a separate retrieval program will be started for every cache sublist 218. As indicated above, the retrieval programs execute in parallel to retrieve the requested documents. Once complete, and if being run as a daemon (i.e., continuously), the program will return to step "C" 132 in flow diagram 100 to repeat the steps beginning with reading the input files 114.

Referring now to FIG. 8, a non-daemon method flow diagram 300 is shown. As indicated above, in step 110 of flow diagram 100, it will be determined whether document system 22 is being run as a daemon. If not, the program will proceed to step "B" 112 of flow diagram 300. From this step, input files 16 are read 302 and the request list is built 304. Similar to flow diagram 100, it will then be determined whether input files 16 are in hit list format 306. If not, the hit list is built by query 310. If, however, input files 16 are in hit list format, the hit list is built simply by rearranging the information therein 308. Once the hit list is built, the documents are retrieved in bulk 312. That is, the hit list is not processed (sorted and split). Rather all documents on the hit list are simply retrieved in bulk. Once retrieved, error files for any input files 16 containing errors are generated 314 and the program is terminated 108.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls library system 20 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

In a typical embodiment, the present invention is implemented using CONTENT MANAGER ONDEMAND available from International Business Machines, Corp. of Armonk N.Y.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for automatically retrieving documents, comprising
generating a hit list of documents to be retrieved, wherein the hit list is generated directly from an input file of requests, wherein the input file includes location identifications where the documents are stored, and wherein the location identifications are selected from the group consisting of system identification, data object identification, storage drive identification and cache identification;
processing the hit list according to system, data object and storage drive; and
retrieving the documents based on the processed hit list from at least one remote location.

2. The method of claim 1, wherein the hit list is further processed according to cache and storage node.

3. The method of claim 1, wherein the processing comprises:
sorting the hit list according to system, cache, storage node and data object; and
splitting the sorted hit list into sublists according to system and storage drive.

4. The method of claim 3, wherein the processing further comprises splitting the sorted hit list according to cache.

5. The method of claim 1, further comprising generating an error file for each of the requests containing an error.

6. The method of claim 1, further comprising optionally creating an index file of document requests.

7. The method of claim 1, wherein the retrieving comprises launching a plurality of retrieval programs to retrieve the documents in the processed hit list, wherein the plurality of retrieval programs execute in parallel.

8. The method of claim 1, wherein the retrieving comprises retrieving the documents in the processed hit list in bulk.

9. A method for automatically retrieving documents, comprising:
providing a hit list of documents to be retrieved, wherein the hit list is generated directly from an input file of requests, and wherein the hit list includes location identifications where the documents are stored, wherein the location identifications are selected from the group consisting of system identification, data object identification, storage drive identification and cache identification;
sorting and splitting the hit list into sublists according to system, data object and storage drive; and
launching a plurality of retrieval programs, wherein each of the plurality of retrieval programs corresponds to one of the sublists, and wherein the plurality of retrieval programs execute in parallel to retrieve the documents.

10. The method of claim 9, wherein the providing comprises:
receiving an input file of requests having location identifications; and
generating the hit list directly from the requests.

11. The method of claim 9, wherein the sorting and splitting comprises:
sorting the hit list according to system, cache, storage node and data object; and
splitting the sorted hit list into sublists according to system and storage drive.

12. The method of claim 11, further comprising splitting the sorted hit list according to cache.

13. The method of claim 9, further comprising generating an error file for each of the requests containing an error.

14. The method of claim 9, further comprising optionally creating an index file of document requests.

15. A method for automatically retrieving documents, comprising:
generating a hit list of documents to be retrieved directly from an input file of requests on a library system, wherein the input file includes location identifications where the documents are stored, wherein the location identifications are selected from the group consisting of system identification, data object identification, storage drive identification and cache identification;
sorting the hit list according to system, cache, storage node and data object;
splitting the sorted hit list into sublists according to at least one of system, storage drive and cache; and
launching a plurality of retrieval programs to retrieve the documents from at least one remote location, wherein each of the plurality of retrieval programs corresponds to one of the additional sublists, and wherein the plurality retrieval programs execute in parallel.

16. The method of claim 15, further comprising generating an error file for each of the requests containing an error.

17. The method of claim 15, further comprising optionally creating an index file of document requests.

18. A system for automatically retrieving documents, comprising:
a list system for generating a hit list of documents to be retrieved, wherein the hit list is generated directly from an input file of requests received on a library system, wherein the input file includes location identifications where the documents are stored, and wherein the location identifications are selected from the group consisting of system identification, data object identification, storage drive identification and cache identification;
a processing system for processing the hit list according to system, data object and storage drive; and
a retrieval system for retrieving the documents based on the processed hit list from at least one remote location.

19. The system of claim 18, wherein the hit list is further processed according to cache and storage node.

20. The system of claim 18, wherein the processing system comprises:
a sorting system for sorting the hit list according to system, cache, storage node and data object;
a server system for splitting the sorted hit list into sublists according to system; and
a storage drive system for splitting the sublists into additional sublists according to storage drive.

21. The system of claim 20, wherein the processing system further comprises a cache system for splitting the sublists according to cache.

22. The system of claim 18, further comprising an output system for generating an error file for each of the requests containing an error.

23. The system of claim 18, further comprising an index system for optionally creating an index file of document requests.

24. The system of claim 18, wherein the retrieval system comprises a launching system for launching a plurality of retrieval programs to retrieve the documents in the processed hit list, wherein the plurality of retrieval programs execute in parallel.

25. The system of claim 18, wherein the retrieval system comprises a bulk system for retrieving the documents in the processed hit list in bulk.

26. A program product stored on a recordable medium for automatically retrieving documents, which when executed comprises:
program code for generating a hit list of documents to be retrieved, wherein the hit list is generated directly from an input file of requests received on a library system, wherein the input file includes location identifications where the documents are stored, and wherein the location identifications are selected from the group consisting of system identification, data object identification, storage drive identification and cache identification;
program code for processing the hit list according to system, data object and storage drive; and
program code for retrieving the documents based on the processed hit list from at least one remote location.

27. The program product of claim 26, wherein the hit list is further processed according to cache and storage node.

28. The program product of claim 26, wherein the processing system comprises:
program code for sorting the hit list according to system, cache, storage node and data object;
program code for splitting the sorted hit list into sublists according to system; and
program code for splitting the sublists into additional sublists according to storage drive.

29. The program product of claim 28, wherein the processing system further comprises program code for splitting the sublists according to cache.

30. The program product of claim 26, further comprising program code for generating an error file for each of the requests containing an error.

31. The program product of claim 26, further comprising program code for optionally creating an index file of document requests.

32. The program product of claim 26, wherein the retrieval system comprises program code for launching a plurality of retrieval programs to retrieve the documents in the processed hit list, wherein the plurality of retrieval programs execute in parallel.

33. The program product of claim 26, wherein the retrieval system comprises program code for retrieving the documents in the processed hit list in bulk.

* * * * *